(12) United States Patent
Matthews

(10) Patent No.: US 12,592,639 B2
(45) Date of Patent: Mar. 31, 2026

(54) SELF-BIASING THE INPUT CONTROLLER IN A POWER CONVERTER

(71) Applicant: POWER INTEGRATIONS, INC., San Jose, CA (US)

(72) Inventor: David Michael Hugh Matthews, Los Gatos, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 142 days.

(21) Appl. No.: 18/393,278

(22) Filed: Dec. 21, 2023

(65) Prior Publication Data

US 2025/0211220 A1 Jun. 26, 2025

(51) Int. Cl.
H02M 3/158 (2006.01)

(52) U.S. Cl.
CPC .................................... H02M 3/158 (2013.01)

(58) Field of Classification Search
None
See application file for complete search history.

(56) References Cited

U.S. PATENT DOCUMENTS

| | | |
|---|---|---|
| 4,005,352 A | 1/1977 | Kugler et al. |
| 5,014,178 A | 5/1991 | Balakrishnan |
| 5,282,107 A | 1/1994 | Balakrishnan |
| 5,285,369 A | 2/1994 | Balakrishnan |
| 5,602,724 A | 2/1997 | Balakrishnan |
| 6,583,663 B1 | 6/2003 | Disney |

| | | | |
|---|---|---|---|
| 6,597,588 B2 * | 7/2003 | Matsumoto | ....... H02M 3/33507 |
| | | | 363/21.16 |
| 6,775,155 B2 | 8/2004 | Park | |
| 6,865,093 B2 | 3/2005 | Disney | |
| 7,157,813 B2 | 1/2007 | Djenguerian et al. | |
| 7,345,894 B2 | 3/2008 | Sawtell et al. | |
| 7,489,120 B2 | 2/2009 | Matthew | |
| 7,932,738 B1 | 4/2011 | Banerjee et al. | |
| 8,063,622 B2 | 11/2011 | Kung et al. | |

(Continued)

FOREIGN PATENT DOCUMENTS

| | | |
|---|---|---|
| CN | 103023298 A | 4/2013 |
| CN | 115113670 A | 9/2022 |
| WO | 2021126826 A1 | 6/2021 |

OTHER PUBLICATIONS

Broadmeadow, Mark; "Characterisation of the cascode gate drive of power MOSFETs in clamped inductive switching applications"; Mar. 25, 2015; Queensland University of Technology; pp. 81-85.

(Continued)

*Primary Examiner* — Thomas J. Hiltunen

(57) ABSTRACT

A power converter having an integrated input bias self-supply function has an input switch, a controller, an output switch, and an output filter having an inductor. The controller includes control circuitry, a bias drive circuit, and a bias supply circuit. The bias supply circuit includes a bias transistor and a bias diode. The control circuitry and the bias drive circuit produce a bias drive signal indicative of the conductive states of the input and output switches. When the bias drive signal is asserted, the bias transistor is configured to be on and the bias diode is configured to be reverse biased and not conduct any forward current. When the bias drive signal is deasserted, the bias transistor is configured to be off.

15 Claims, 8 Drawing Sheets

(56)          References Cited

U.S. PATENT DOCUMENTS

| 8,077,486 | B2 | 12/2011 | Djenguerian et al. | |
| 8,120,097 | B2 | 2/2012 | Disney | |
| 8,159,843 | B2 | 4/2012 | Lund et al. | |
| 8,294,377 | B2 | 10/2012 | Kang et al. | |
| 8,305,826 | B2 | 11/2012 | Banerjee et al. | |
| 8,779,841 | B2 | 7/2014 | Ivankovic | |
| 8,933,649 | B2 | 1/2015 | Matthews et al. | |
| 9,112,428 | B2 | 8/2015 | Bailey et al. | |
| 9,219,420 | B1 | 12/2015 | Zhang et al. | |
| 9,287,784 | B2 | 3/2016 | Zhang et al. | |
| 9,331,587 | B2 | 5/2016 | Djenguerian et al. | |
| 9,479,065 | B2 | 10/2016 | Mao et al. | |
| 9,531,264 | B2 | 12/2016 | Ryan et al. | |
| 9,577,520 | B2 * | 2/2017 | Xiu | H02M 3/156 |
| 9,602,009 | B1 | 3/2017 | Baurle | |
| 9,621,050 | B2 | 4/2017 | Ryan et al. | |
| 9,667,154 | B2 | 5/2017 | Colbeck | |
| 9,735,663 | B2 | 8/2017 | Bhasin et al. | |
| 9,871,510 | B1 | 1/2018 | Horwitz et al. | |
| 9,917,584 | B2 * | 3/2018 | Gong | H02M 3/07 |
| 9,954,461 | B1 | 4/2018 | Duvnjak | |
| 9,983,239 | B2 | 5/2018 | Mayell | |
| 10,038,434 | B2 | 7/2018 | Volke et al. | |
| 10,135,357 | B1 | 11/2018 | Balakrishnan et al. | |
| 10,177,666 | B2 | 1/2019 | Djenguerian et al. | |
| 10,326,306 | B2 | 6/2019 | Peter et al. | |
| 10,404,180 | B2 | 9/2019 | Greenwood | |
| 10,551,224 | B2 * | 2/2020 | Kobayashi | H02J 7/007182 |
| 10,644,688 | B2 | 5/2020 | Wang | |
| 10,797,598 | B1 | 10/2020 | Malla et al. | |
| 10,924,028 | B2 | 2/2021 | Duvnjak | |
| 11,258,369 | B2 | 2/2022 | Odell | |
| 11,418,121 | B2 | 8/2022 | Odell et al. | |
| 11,979,090 | B2 | 5/2024 | Werner et al. | |
| 12,261,533 | B2 | 3/2025 | Bonavente et al. | |
| 2012/0133348 | A1 | 5/2012 | Fan | |
| 2013/0077353 | A1 | 3/2013 | Kuang et al. | |
| 2014/0077867 | A1 | 3/2014 | Chen | |
| 2019/0393871 | A1 | 12/2019 | Springett | |
| 2021/0203235 | A1 | 7/2021 | Odell et al. | |
| 2021/0257923 | A1 | 8/2021 | Odell | |
| 2021/0351707 | A1 | 11/2021 | Bianco et al. | |
| 2022/0360177 | A1 | 11/2022 | Castellano et al. | |
| 2022/0393603 | A1 | 12/2022 | Chen | |
| 2023/0051129 | A1 | 2/2023 | Werner et al. | |
| 2023/0170803 | A1 | 6/2023 | Ferrara et al. | |
| 2023/0188046 | A1 | 6/2023 | Chen | |
| 2024/0186903 | A1 | 6/2024 | Matthews | |
| 2024/0213903 | A1 | 6/2024 | Matthews et al. | |
| 2025/0211120 | A1 * | 6/2025 | Ezra | H02M 1/0019 |

OTHER PUBLICATIONS

European Application Serial No. 22185215.5; "Communication pursuant to Article 94(3) EPC"; mailed Jan. 26, 2024; 6 pages.
European Application Serial No. 22185215.5; "Extended European Search Report"; mailed Dec. 22, 2022; 8 pages.
Jia, Liang et. al.; "Cascode Switching Modeling and Improvement in Flyback Converter for LED Lighting Applications"; IEEE 978-1-5386-1189-7/18; 2018; 8 pages.
Machine translation of CN103023298A; published Nov. 5, 2014; 7 pages.
Power Integrations, Inc., "LinkSwitch-TN2 Family: Highly Energy Efficient Off-line Switcher IC with Integrated System Level Protection for Low Component-Count Power Supplies"; Jun. 2023; 28 pages.
U.S. Appl. No. 17/401,198; "Non-Final Office Action mailed Mar. 6, 2023"; 13 pages.
U.S. Appl. No. 17/401,198; "Final Office Action mailed Jul. 17, 2023"; 13 pages.
U.S. Appl. No. 17/401,198; "Corrected Notice of Allowance mailed Jan. 22, 2024"; 2 pages.
U.S. Appl. No. 17/401,198; "Notice of Allowance mailed Jan. 11, 2024"; 8 pages.
U.S. Appl. No. 18/061,191; "Application as Filed"; filed Dec. 2, 2022; 58 pages.
U.S. Appl. No. 18/061,191; "Non-Final Office Action mailed Apr. 2, 2025"; 16 pages.
U.S. Appl. No. 18/393,347; "Application as Filed"; filed Dec. 21, 2023; 28 pages.
Non-Final office action received for U.S. Appl. No. 18/061,191, mailed on Aug. 25, 2025, 22 pages.

* cited by examiner

SELF-BIASING THE INPUT CONTROLLER IN A POWER CONVERTER

CROSS-REFERENCE TO RELATED APPLICATION

This application relates to a power converter having an integrated self-bias function described in the following application filed concurrently herewith. The related application, which is incorporated herein by reference, is U.S. patent application Ser. No. 18/393,347, of Noam Ezra, et al.; entitled "Output Conduction Detection in a Buck Converter."

FIELD OF THE INVENTION

The present invention relates generally to power converters, and more specifically to buck converters. Even more specifically, the present invention relates to biasing buck converters.

BACKGROUND

Electric utilities transmit unregulated alternating current (ac), which carries electrical signals across long distances and between buildings. This transmission requires a very high voltage that most circuits, e.g., electronic devices, within houses and businesses cannot handle. The voltage needs to be stepped down to be used in those settings. Switched mode power converters, also referred to as switching power converters, are commonly used to provide a lower voltage to many of today's electronics due to their high efficiency, small size, and low weight. The switched mode power converter converts high voltage related to the unregulated ac input, to a lower voltage related to a constant or stable direct current (dc) output also known as a regulated dc output through an energy transfer element, e.g., a transformer. The switched mode power converter usually provides dc output regulation by sensing one or more signals representative of one or more output quantities, for example, voltage, current, or the combination of the two, and controlling the output in a closed loop. In operation, a switch is used to provide the desired output by varying the duty cycle, the switching frequency, or varying the number of pulses per unit time of the switch in a switched mode power converter.

Power converters generally include one or more controllers which sense and regulate the output of the power converter. These controllers generally require a regulated or unregulated voltage source to power the circuit components of the controller. A bypass or bias capacitor coupled to a controller may provide operating power to the circuits of the controller.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
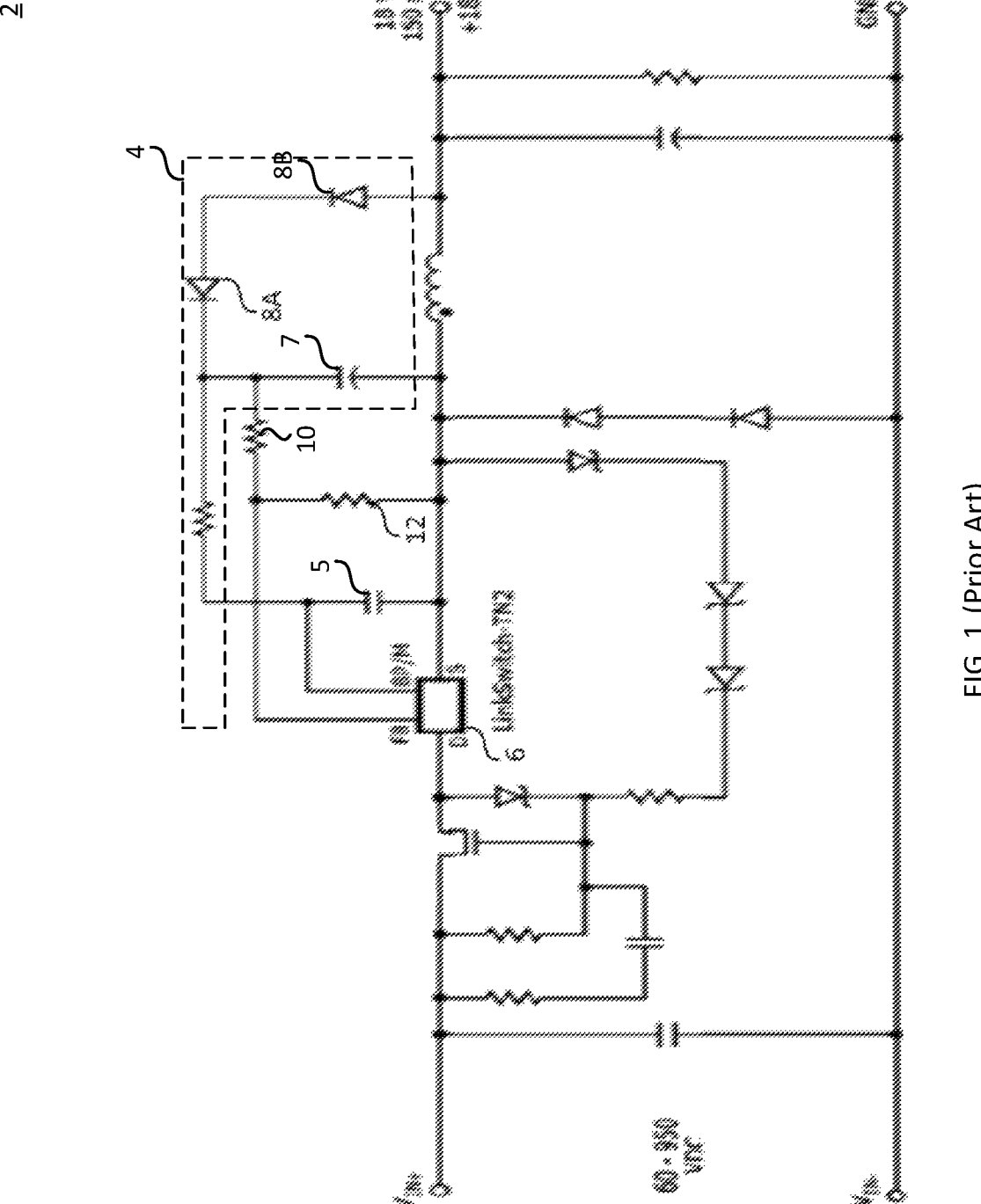
FIG. 1 is a prior art power converter, e.g., a buck converter, that shows bias supply circuitry for a LinkSwitch-TN2™ controller offered by Power Integrations for a very high input voltage application, e.g., 800V electric vehicles.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics, e.g., the first drive circuit 34 and the second drive circuit 32, may be included in a monolithic integrated circuit or a single integrated circuit package, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The embodiments disclosed are directed towards a controller for a power converter having an input switch, an output switch, and an output filter circuit coupled to the input and the output switches. The output filter circuit includes a control circuit, a bias transistor, and a bias diode. The control circuit is coupled to detect when the input switch is non-conducting and the output switch is conducting, and responsive to detection producing a bias drive signal. The bias transistor has an output coupled to an inductive element of the output filter circuit and is further coupled to receive the bias drive signal. The bias diode has a first end coupled to an input of the bias transistor and to an output of the output switch and has a second end coupled to a bias capacitor. The bias capacitor is coupled to the inductive element. The bias control signal enables the integrated input bias self-supply function. The output filter circuit delivers energy to the bias transistor when the bias control signal is asserted. The output filter circuit stores energy in the bias capacitor when the bias control signal is deasserted.

FIG. 1 is a buck converter 2 that shows bias supply circuitry 4 needed for the bias supply of a LinkSwitch-TN2™ controller 6 offered by Power Integrations when used in very high input voltage application, e.g., 800V electric vehicles. The controller 6 is an input controller because the source pin is not referenced to the system GND. The supply to the controller 6 may be referred to as an input bias supply.

In lower input voltage applications, a single low-cost diode is normally used to provide the input bias supply. For a high input voltage application, two 1000v diodes 8A, 8B are used. The use of lower voltage diodes requires parallel resistors to ensure equal voltage distribution. These resistors add a discharge path that reduces energy efficiency. The discharge path increases the value of the capacitor 5 needed to retain sufficient charge between switching cycles at light or no load when refresh frequency of the input bias supply would be comparably very low.

The resistors 10, 12 provide feedback to the controller 6 because the voltage across the capacitor 7 is approximately the output voltage of the buck converter 2. In this application, the diodes 8A, 8B plus the capacitor 7 provide output voltage feedback to the controller 6 as well as establishing the bias supply for the controller 6.

Figure 2:
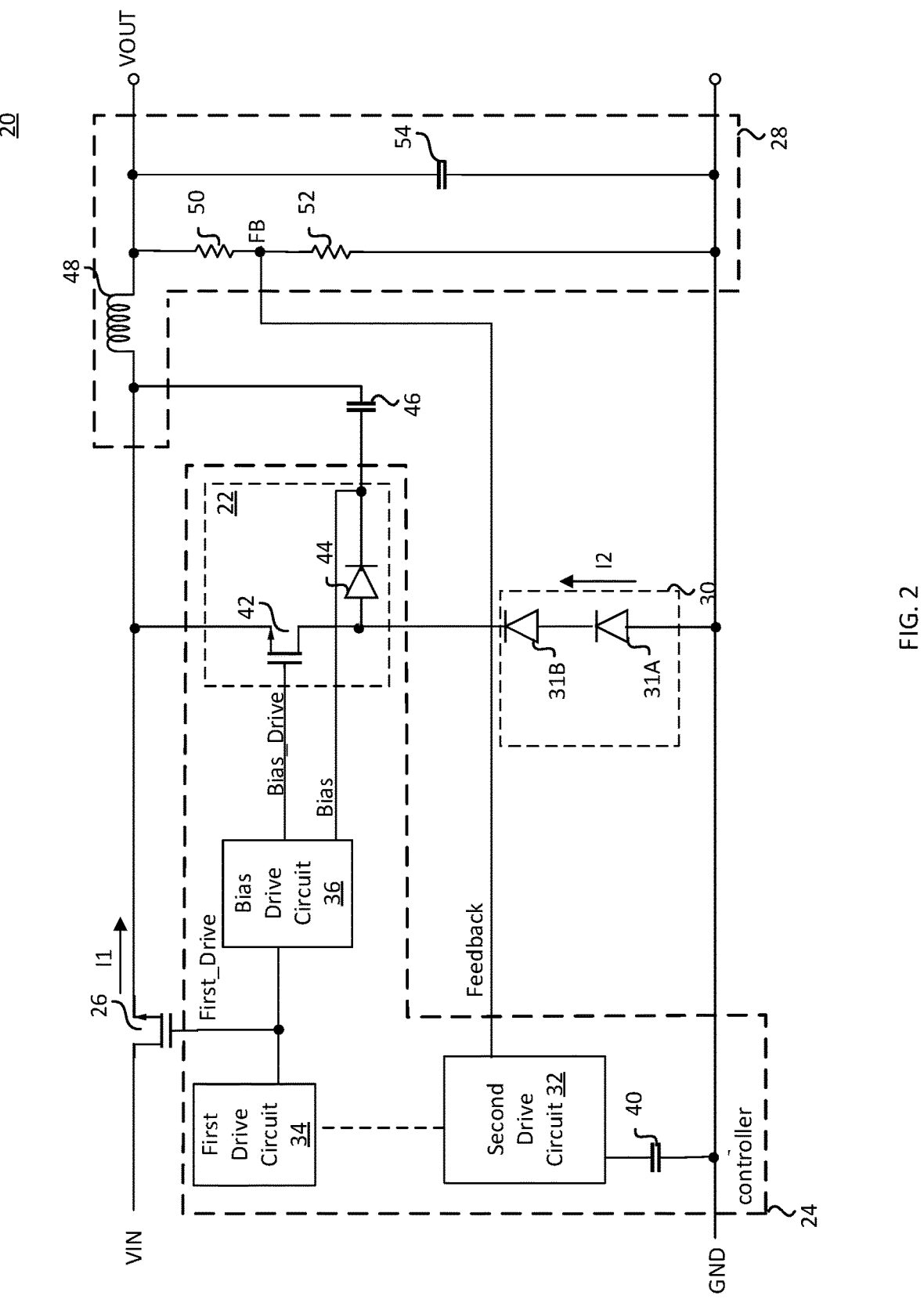
FIG. 2 illustrates an example functional block diagram of a dc power converter 20 with an integrated input bias self-supply function.

FIG. 2 illustrates an example functional block diagram of a dc power converter 20, e.g., a buck converter, with an integrated input bias self-supply function. The output voltage of the dc power converter 20 is sensed directly on the output of the dc power converter 20. A controller 24 connects to a first input switch 26, an output filter circuit 28, a bias capacitor 46, and an output circuit 30. The input side of a buck converter is also referred to as the high side, as it may be connected to the high voltage unregulated ac input. The output side of a buck converter is also referred to as the low side, as it may be connected to the lower voltage regulated de output.

The drain of the first input switch 26 is coupled to the Vin terminal of the power supply (not shown) and the source of the first input switch 26 is coupled to the output filter circuit 28.

The controller 24 includes a second drive circuit 32, a first drive circuit 34, a bias drive circuit 36, and a bias supply circuit 22. The first drive circuit 34 is responsive to circuitry from the input side of the power converter. The second drive circuit 32 is responsive to circuitry from the output side of the power converter. The controller 24 facilitates communication between the input and output sides of the power converter. The bias drive circuit 36 may be included as part of the first drive circuit 34. The gate of the first input switch 26 receives a First_Drive signal from the first drive circuit 34. A drive capacitor 40 is coupled between the second drive circuit 32 and the reference ground (GND).

The bias supply circuit 22 is coupled to the bias drive circuit 36 and to the source of the first input switch 26. A bias transistor 42 has a gate that receives the Bias_Drive signal from the bias drive circuit 36 and a source coupled to the first input switch 26. A cathode of a bias diode 44 and the bias capacitor 46 are electrically in series. The anode of the bias diode 44 is coupled to the drain of the bias transistor 42. The bias capacitor 46 is coupled to the source of the first input switch 26. A bias node between the cathode of the bias diode 44 and the bias capacitor 46 may be accessed to provide a Bias signal to the bias drive circuit 36. The electrical energy stored on bias capacitor 46 coupled to provide power to the bias drive circuit 36 and first drive circuit 34. The Bias signal indicates the available charge at the bias capacitor 46.

An output filter circuit 28 is coupled between the source of the first input switch 26 and reference ground. An inductive element 48, e.g., an inductor, is coupled between the source of the first input switch 26 and the terminal VOUT. A series of feedback FB resistors 50, 52 is coupled between the terminal VOUT and reference ground. The node FB between the feedback resistors 50, 52 may be accessed to provide a Feedback signal to the second drive circuit 32. The Feedback signal is indicative of the voltage provided at the output of the power converter. An output capacitor 54 is coupled between the terminal VOUT and reference ground.

The output circuit 30, e.g. diodes 31A and 31B, is coupled between reference ground and the drain of the bias transistor 42.

In operation, the feedback information derived from feedback resistors 50, 52 is communicated to the first drive circuit 34 from the second drive circuit 32. The first drive circuit 34 provides the First Drive signal to the gate of the first input switch 26 and the bias drive circuit 36. As discussed above, the Bias_Drive signal from the bias drive circuit 36 is received at the gate of bias transistor 42. Thus, the bias supply circuit 22 is operative to conduct the freewheeling current I2 through bias transistor 42 to the output of the dc power converter 20 when bias transistor 42 is in the ON state or to divert freewheeling current I2 through bias diode 44 into the bias capacitor 46 when bias transistor 42 is in the OFF state. The Bias signal at the bias node indicates the voltage and charge available from the bias capacitor 46.

Figure 3:
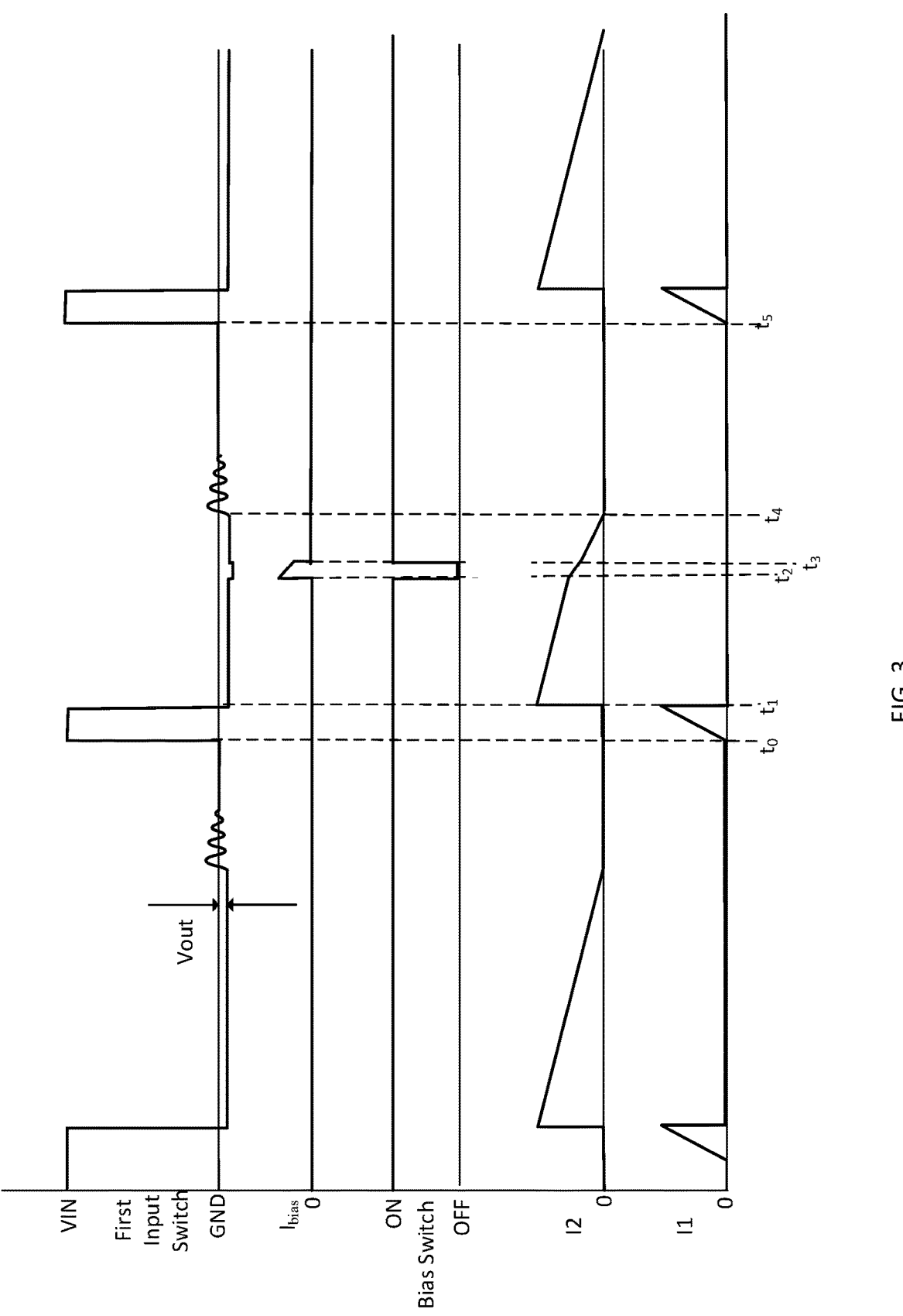
FIG. 3 shows timing diagram waveforms to describe the operation of the converter shown in FIG. 2.

FIG. 3 shows timing diagram waveforms to describe the operation of the converter shown in FIG. 2. The time period from $t_0$ to $t_5$ describes the waveforms as related to the bias supply circuit 22.

At time to, the first input switch 26 turns on from to until time $t_1$. During that time, the input current I1 ramps in the first input switch 26 and the inductive element 48. The switching cycle shown prior to $t_0$ is one where bias transistor 42 remains on the whole time such that the bias capacitor 46 is not recharged. The bias drive circuit 36 controls the switching of bias transistor 42 to perform the regulation of voltage across bias capacitor 46.

At time $t_1$, the first input switch 26 turns OFF and the freewheeling current I2 is established flowing through the output circuit 30 and the bias transistor 42. The bias transistor 42 is in the ON state. The voltage across first input switch 26 is then the input voltage Vin to the converter plus the total forward drop across the output circuit 30 and the resistive drop across the bias transistor 42.

At time $t_2$, the bias drive circuit 36 detects the need to replenish the charged stored in the bias capacitor 46 by monitoring the Bias signal at the bias node. If a need is detected, the bias transistor 42 is switched to the OFF state. At this time, the voltage across the first input switch 26 increases to Vin plus the total forward drop across the output circuit 30 and the bias diode 44 plus the voltage on the bias capacitor 46 to maintain the freewheeling current I2 flow. The freewheeling current I2 and the bias current $I_{bias}$ become equal flowing into the bias capacitor 46.

The di/dt slope in the freewheeling current I2 increases from period $t_2$ to $t_3$ due to the higher voltage in the freewheeling current path (because the voltage on the bias capacitor 46 is added to the freewheeling path).

At time $t_3$, the bias drive circuit 36 detects that no further charge is required to be stored in the bias capacitor 46 and the bias transistor 42 is turned on.

From $t_3$ to $t_4$, the di/dt of the freewheeling current I2 is substantially the same as the di/dt of I2 between times $t_1$ and $t_2$.

At time $t_4$, the energy stored in the inductive element 48 has decayed to zero and the freewheeling current I2 is zero. At this time, the voltage across the first input switch 26 reduces to an average value of (Vin–Vout) although it rings around this voltage at a frequency determined by the parasitic capacitance and inductance value associated with the inductor.

At time $t_5$, another converter switching cycle is initiated with the first input switch 26 turning ON.

Figure 4:
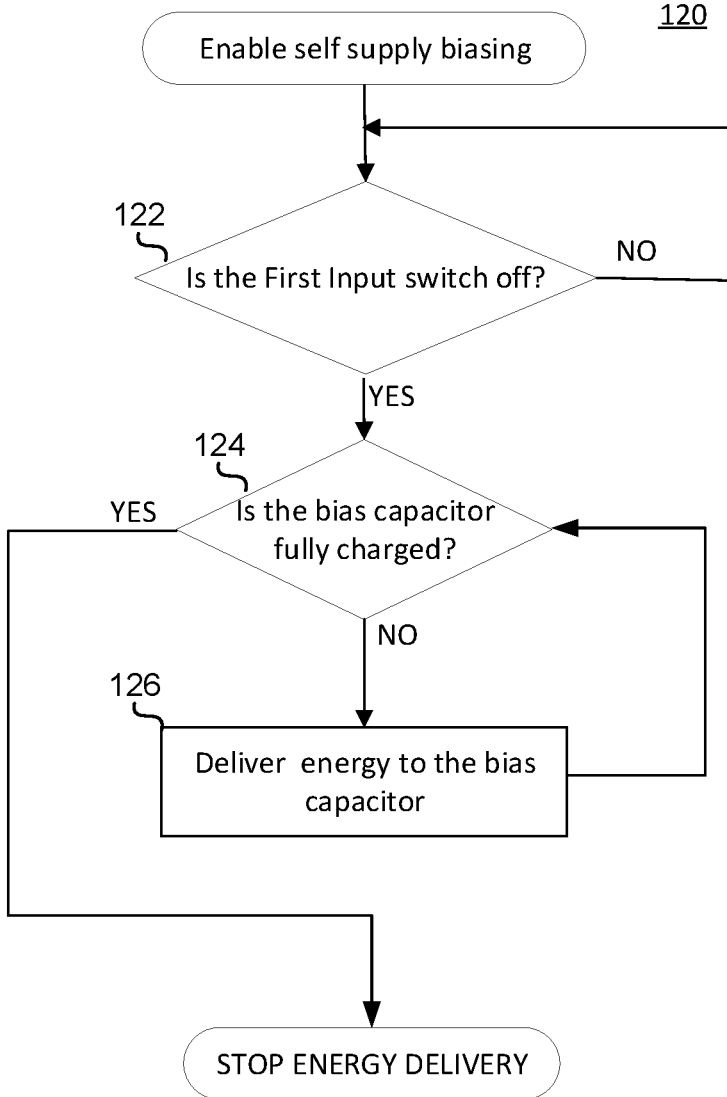
FIG. 4 is a process flowchart 120 enabling self-supply biasing for the input controller shown in FIG. 3.

FIG. 4 is a process flowchart 120 enabling self-supply biasing for the input controller shown in FIG. 3.

In step 122, the bias drive circuit 36 determines the state of the input switch 26. If the input switch 26 is ON, step 120 is repeated.

If the input switch 26 is OFF, then in step 124, the bias drive circuit 36 determines if the bias capacitor 46 is fully charged. If yes, stop energy delivery. If no, go to step 126.

In step 126, energy is delivered to the bias capacitor 46. Return to step 124.

Figure 5:
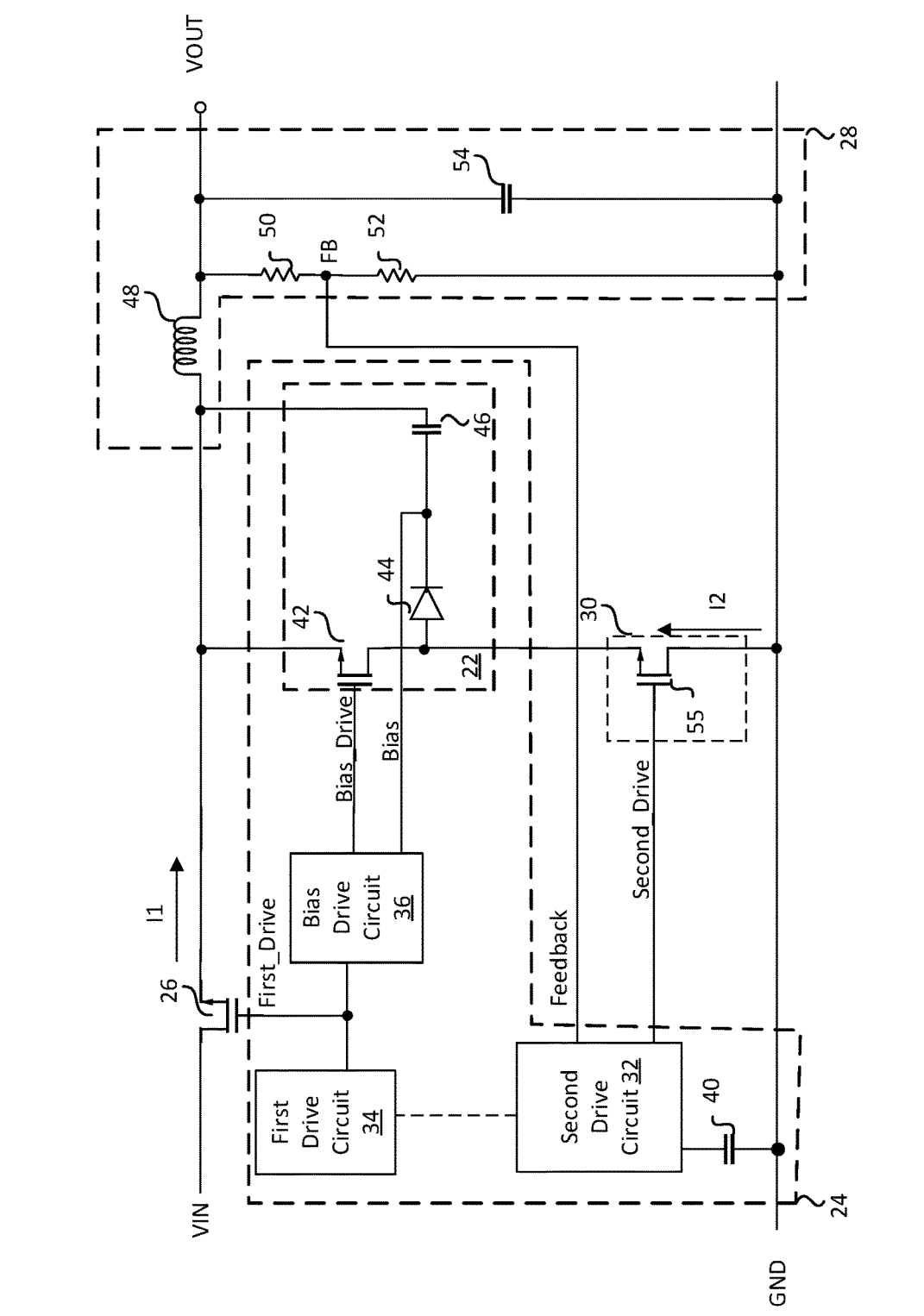
FIG. 5 illustrates an alternate embodiment of a buck converter 20' with an integrated input supply function.

FIG. 5 illustrates an alternate embodiment of a buck converter 20' with an integrated input supply function. FIG. 5 replaces diodes 31A, 31B of the output circuit 30 shown in FIG. 2 with a second input switch 55. The second drive circuit 32 provides a Second Drive signal to the second input switch 55. The second input switch 55 may also be used to establish a zero-voltage switching condition on the first input switch 26 at the beginning of the next switching cycle just before the first input switch 26 turns on each switching cycle.

Figure 6:
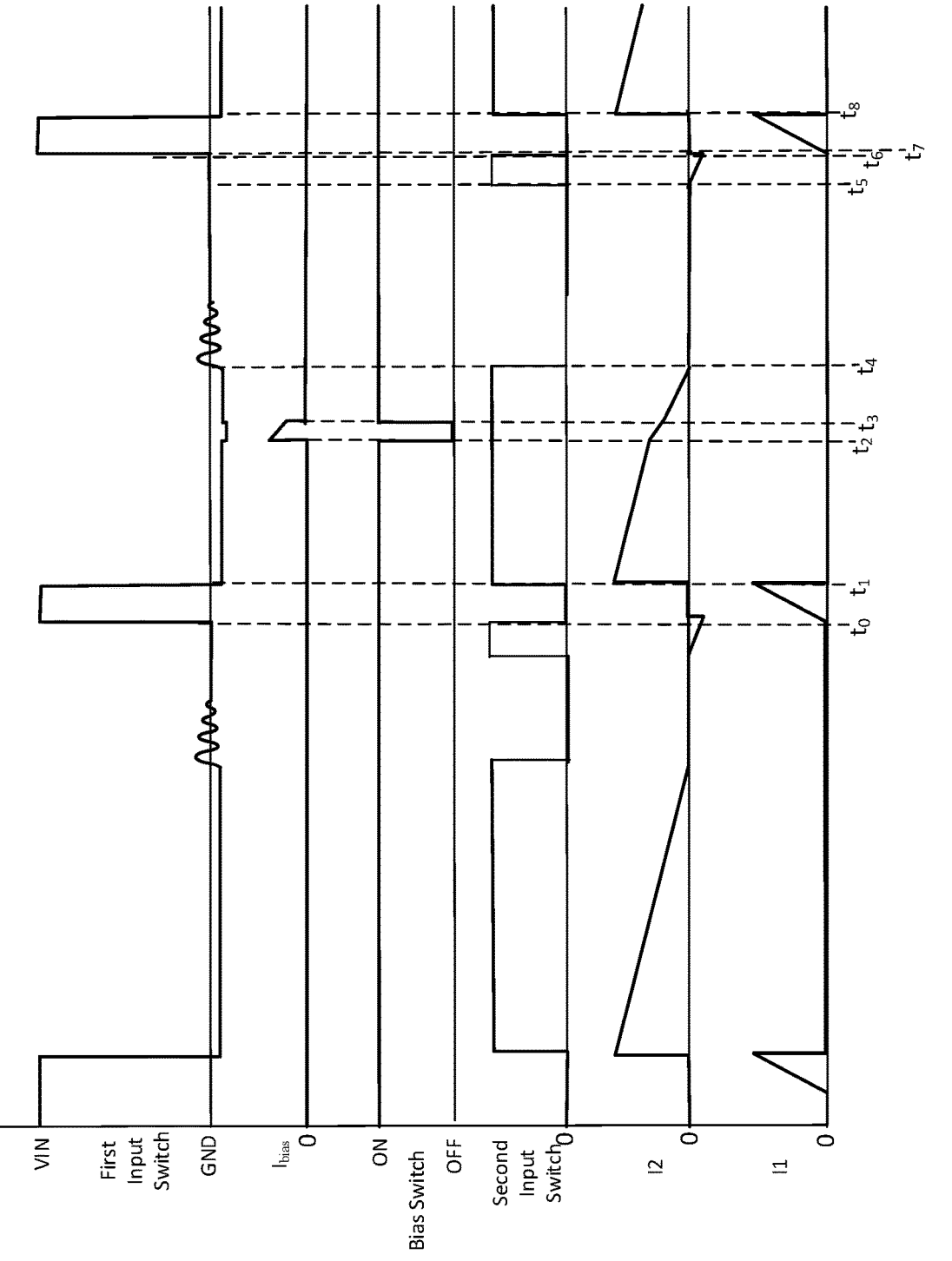
FIG. 6 shows timing diagram waveforms to describe the operation of the buck converter shown in FIG. 5.

FIG. 6 shows timing diagram waveforms to describe the operation of the buck converter shown in FIG. 5. The time period from $t_0$ to $t_8$ describes the waveforms as related to the bias supply circuit 22 when there is zero voltage switching.

At time to, the first input switch 26 turns on until time $t_1$. During that time, the input current I1 ramps in the first input switch 26 and the inductive element 48. The switching cycle shown prior $t_0$ to is one where the bias transistor 42 remains on the whole time such that the bias capacitor 46 is not recharged during that switching cycle. The bias drive circuit 36 controls the switching of the bias transistor 42 to perform the regulation of voltage across the bias capacitor 46.

At time $t_1$, the first input switch 26 turns OFF and the freewheeling current I2 is established flowing through the second input switch 55 and the bias transistor 42. The bias transistor 42 is in the ON state. The voltage across the first input switch 26 is then the input voltage Vin to the converter plus the forward drop across the second input switch 55 and resistive drop across the bias transistor 42.

At time $t_2$, the bias drive circuit 36 detects the need to replenish the charged stored in the bias capacitor 46 and turns the bias transistor 42 into the OFF state. At this time, the voltage across the first input switch 26 increases to Vin plus the forward drop across the second input switch 55 and the bias diode 44 plus the voltage on the bias capacitor 46 to maintain the freewheeling current flow. The freewheeling current I2 and the bias current $I_{bias}$ become equal flowing into the bias capacitor 46.

The di/dt slope in the freewheeling current I2 increases from period $t_2$ to $t_3$ due to the higher voltage in the freewheeling current path (because the voltage on the bias capacitor 46 is added to the freewheeling path).

At time $t_3$, the bias drive circuit 36 detects that no further charge is required to be stored in the bias capacitor 46 and the bias transistor 42 is turned on.

From $t_3$ to $t_4$, the di/dt of the freewheeling current I2 is substantially the same as the di/dt of the freewheeling current I2 between times $t_1$ and $t_2$.

At time $t_4$, the energy stored in the inductive element 48 has decayed to zero and the freewheeling current I2 is zero. At this time, the voltage across the first input switch 26 reduces to an average value of (Vin–Vout) although it rings around this voltage at a frequency determined by the parasitic capacitance and inductance value associated with the inductive element 48.

At time $t_5$, the second input switch 55 is turned on to establish a current ramp in the freewheeling current I2 in the opposite direction to the current flow during the normal buck converter operation (shown in the duration from times $t_1$-$t_4$).

At time to, the second input switch 55 is turned off and the voltage across the first input switch 26 rises due to the energy stored in the inductive element 48 during the time from $t_5$ to $t_6$.

After a short delay, at time $t_7$, first the input switch 26 is turned on when the voltage on the source of the first input switch 26 is substantially equal to the Vin voltage relative to GND which also means there is substantially zero voltage across the first input switch 26 at the time it turns on, hence the term zero voltage switching (ZVS).

Figure 7:
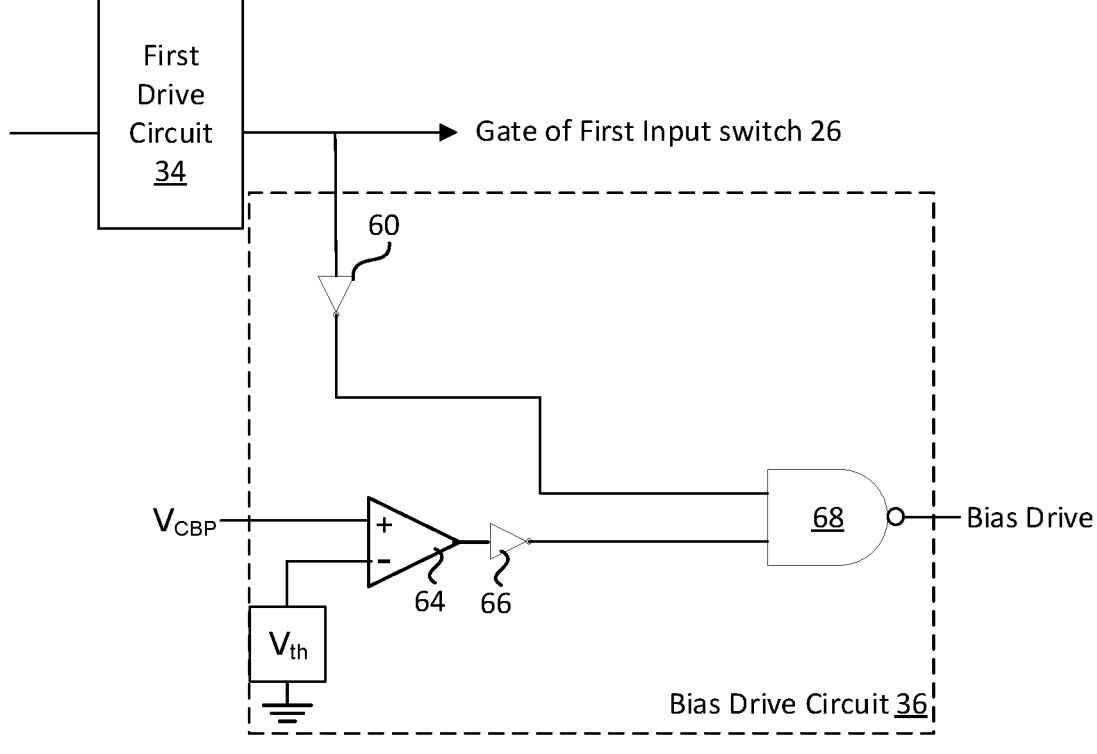
FIG. 7 is a logic diagram corresponding to the bias drive circuit 36.

FIG. 7 is a logic diagram corresponding to the bias drive circuit 36. A first inverter 60 receives the First_Drive signal. A comparator 64 determines if the bias capacitor 46 has reached full charge by comparing the voltage stored in the bias capacitor 46 with a predetermined threshold voltage Vth. A second inverter 66 receives the output of the comparator 64. A NAND gate 68 receives the inverted comparator output and the inverted output of the first input drive circuit 34.

In operation, the output of the NAND gate 68 determines when the inductive element 48 is charged and when the bias capacitor 46 is charged.

Figure 8:
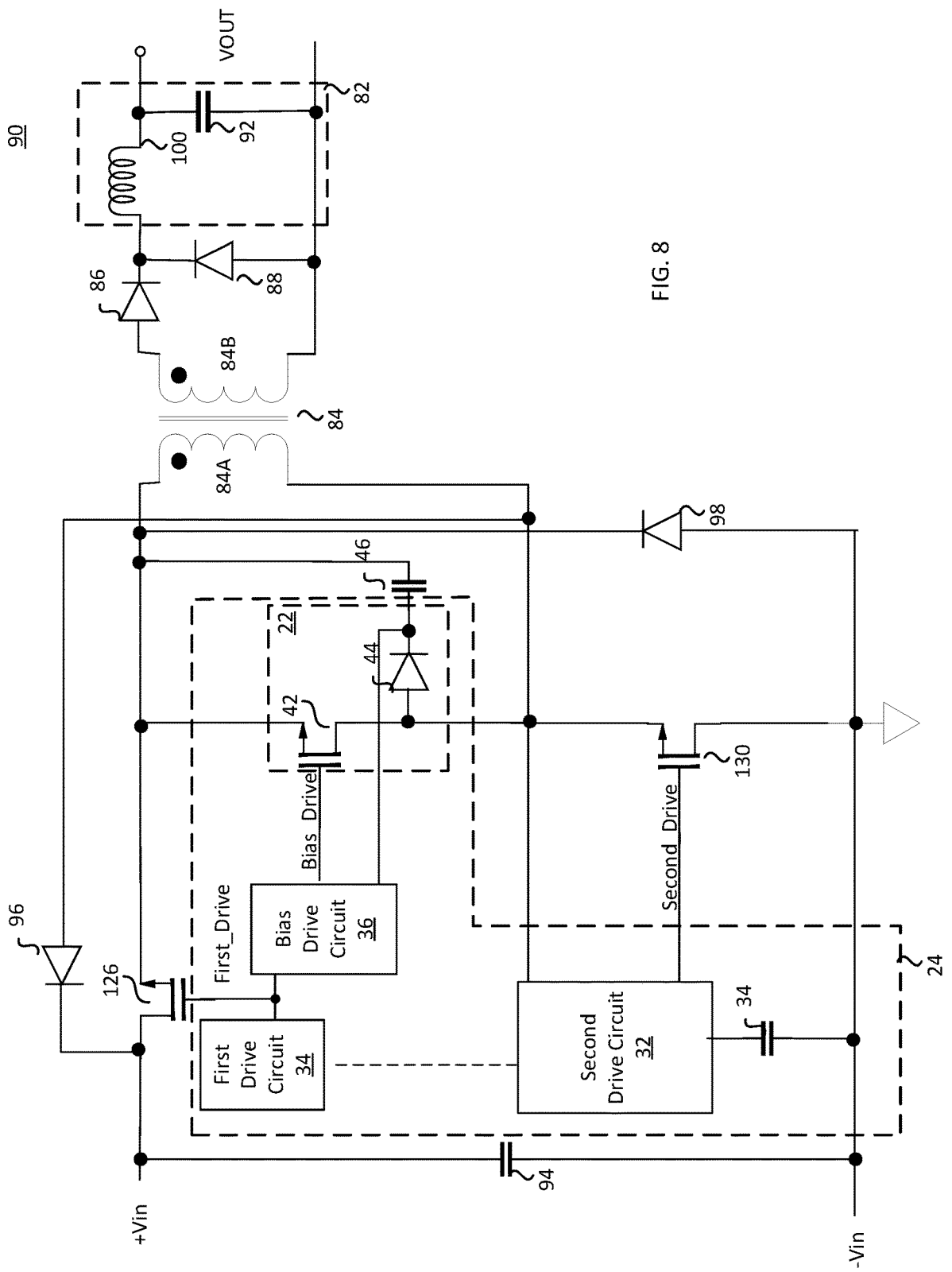
FIG. 8 illustrates an example functional block diagram of a two-switch forward converter 90 with an integrated input supply function.

FIG. 8 illustrates an example functional block diagram of a two-switch forward converter 90 with an integrated input supply function. An energy transfer element 84 connects between the input side of the forward converter and the output side of the forward converter. The energy transfer element 84, e.g., a transformer, has a primary winding 84A and a secondary winding 84B. The first drive circuit 34 is responsive to signals from a first terminal of the primary winding 84A. The second drive circuit 32 is responsive to signals from a second terminal of the primary winding 84B. The controller 24 is identical to that disclosed in FIG. 2.

For the input side of the forward converter, an input capacitor 94 connects between +Vin and –Vin. The first drive circuit 34 of the controller 24 drives a first input switch 126. The second drive circuit 32 of the controller 24 drives a second input switch 130. The first input switch 126 connects between +Vin and the first terminal of the primary winding 84A. The second input switch 130 connects between –Vin and the second terminal of the primary winding 84A. The bias capacitor 46 connects between the bias supply circuit 22 of the controller 24 and the first terminal of the primary winding 84A. A first clamp diode 96 connects from the second terminal of the primary winding 84A to +Vin. A second clamp diode 98 connects from –Vin to first terminal of the primary winding 84A.

For the output side of the forward converter, the first rectifier diode 86 is coupled to a first terminal of a secondary winding 84B of the energy transfer element 84 and to an output of a second rectifier diode 88. The second rectifier diode 88 is further coupled to a second terminal of the secondary winding 84B. An output filter circuit 82 is coupled across the second rectifier diode 88. The output filter circuit 82 includes an inductive element 100, e.g., an inductor, and an output capacitor 92. The inductive element 100 is coupled to the outputs of the first and the second output diodes 86, 88 and to terminal Vout. An output capacitor 92 is coupled to Vout and reference ground GND.

Many of the characteristics of the operation of the power supply 90 and the bias supply circuit 22 are common with the earlier circuit descriptions. When diode 98 is conducting during the off time of the first and the second input switches 126, 130, the current flowing through diode 98 flow through bias supply circuit 22. By turning transistor 42 on and off, the current flowing through diode 98 can be directed to charge bias capacitor 46 (when transistor 42 is off) or directed through transistor 42 when transistor 42 is on. In common with earlier descriptions, the charge stored on bias capacitor 46 can therefore be regulated to provide a supply voltage for input circuits such as first drive circuit 34 and bias drive circuit 36 in line with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1: A controller for a power converter comprising: a second drive circuit coupled to receive a feedback signal indicative of an output of the power converter; a first drive circuit coupled to the second drive circuit and responsive to the feedback signal to produce a first drive signal; a bias drive circuit coupled to the first drive circuit and responsive to the first drive signal to produce a bias drive signal; a bias transistor coupled to the bias drive circuit to receive the bias drive signal; and a bias diode having an anode of the bias diode coupled to a drain of the bias transistor and a cathode of the bias diode coupled to the bias drive circuit, wherein when the bias drive signal is asserted the bias transistor is turned on and the bias diode is reverse biased to not conduct substantially any forward current, and when the bias drive signal is deasserted the bias transistor is turned off.

Example 2. The controller as in example 1 further comprising a bias capacitor coupled to the bias diode, wherein the bias capacitor is coupled to store electrical energy to provide power to the bias drive circuit and to the first drive circuit.

Example 3. The controller as in example 1, the bias drive circuit comprising: an inverter coupled to receive the first drive signal and to produce an inverted first drive signal; a comparator coupled to a bias node between the bias diode and the bias capacitor, wherein the comparator asserts a bias current signal in response to a voltage at the bias node rising above a threshold voltage; and a NAND gate coupled to the inverter and responsive to the inverted first drive signal and the bias current signal to produce the bias drive signal.

Example 4. The controller as in example 1, wherein the first drive circuit and the second drive circuit are included in a monolithic integrated circuit.

Example 5. The controller as in example 1 wherein the first drive circuit and the second drive circuit are included in a single integrated circuit package.

Example 6. The controller as in example 1 the first drive circuit and the bias drive circuit are included in a single integrated circuit package.

Example 7. A buck converter comprising: an input switch; an output filter circuit coupled to the input switch and configured to produce a feedback signal indicative of the output voltage of the buck converter; a bias capacitor coupled to the output filter circuit; an output conductor circuit coupled to the output filter circuit; and a controller coupled to the output filter circuit and to the output conductor circuit, the controller comprising, a second drive circuit coupled to receive the feedback signal, a first drive circuit coupled to the second drive circuit and responsive to the feedback signal to produce a first drive signal, a bias drive circuit, coupled to the bias capacitor and to the first drive circuit, the bias drive circuit responsive to the first drive signal to produce a bias drive signal, a bias transistor coupled to receive the bias drive signal, and a bias diode having an anode of the bias diode coupled to a drain of the bias transistor and a cathode of the bias diode coupled to the bias drive circuit and the bias capacitor, wherein when the bias drive signal is asserted the bias transistor is turned on and the bias diode is reverse biased to not conduct substantially any forward current, and when the bias drive signal is deasserted the bias transistor is turned off.

Example 8. The buck converter as in example 7, the bias drive circuit comprising: an inverter coupled to receive the first drive signal and to produce an inverted first drive signal; a comparator coupled to a bias node between the bias diode and the bias capacitor, wherein the comparator asserts a bias current signal in response to a voltage at the bias node rising above the threshold voltage; and a NAND gate coupled to the inverter and responsive to the inverted first drive signal and the bias current signal to produce the bias drive signal.

Example 9. The buck converter as in claim 7, the output conductor circuit comprising at least one diode.

Example 10. The buck converter as in claim 7, wherein: the second drive circuit is responsive to the feedback signal to produce a second drive signal, and wherein the output conductor circuit comprises a switch responsive to the second drive signal to deliver current to one of the bias diode and the bias transistor.

Example 11. A forward converter comprising: a first input switch and a second input switch; an energy transfer element having a primary winding and a secondary winding, a first end of the primary winding coupled to the first input switch and a second end of the primary winding coupled to the second input switch; a bias capacitor coupled to the first end of the primary winding; a first clamp diode coupled from the second end of the primary winding to a source of the first input switch; a second clamp diode coupled from a source of the second input switch to the first end of the primary winding; a rectifier circuit coupled across a first end and a second end of the secondary winding; an output filter circuit coupled to the rectifier circuit and configured to produce an output voltage signal; and a controller coupled to the first input switch, the bias capacitor, and the second input switch, and responsive to an input voltage signal to produce a first drive signal, the controller comprising, a second drive circuit coupled to the second end of the primary winding to receive a feedback signal indicative of the output voltage signal, a first drive circuit coupled to the second drive circuit and responsive to the feedback signal to produce a first drive signal, a bias drive circuit responsive to the first drive signal to produce a bias drive signal, a bias transistor coupled to receive the bias drive signal, and a bias diode having an anode coupled to the bias transistor and a cathode coupled to the bias drive circuit and to the bias capacitor, wherein when the bias drive signal is asserted the bias transistor is turned on and the bias diode is reverse biased to not conduct substantially any forward current, and when the bias drive signal is deasserted the bias transistor is turned off.

The invention claimed is:

1. A controller for a power converter comprising:
a second drive circuit coupled to receive a feedback signal indicative of an output of the power converter;
a first drive circuit coupled to the second drive circuit and responsive to the feedback signal to produce a first drive signal;
a bias drive circuit coupled to the first drive circuit and responsive to the first drive signal to produce a bias drive signal;
a bias transistor coupled to the bias drive circuit to receive the bias drive signal; and
a bias diode having an anode of the bias diode coupled to a drain of the bias transistor and a cathode of the bias diode coupled to the bias drive circuit,
wherein when the bias drive signal is asserted, the bias transistor is turned on and the bias diode is reverse biased such that current is conducted through the bias transistor toward the output of the power converter, with substantially no current being conducted through the bias diode, and
wherein when the bias drive signal is deasserted, the bias transistor is turned off, causing the current that is otherwise conducted through the bias transistor to be diverted through the bias diode to charge a bias capacitor coupled to the bias diode.

2. The controller as in claim 1 further comprising the bias capacitor coupled to the bias diode, wherein the bias capacitor is charged to store electrical energy to provide power to the bias drive circuit and to the first drive circuit.

3. The controller as in claim 1, the bias drive circuit comprising:
an inverter coupled to receive the first drive signal and to produce an inverted first drive signal;
a comparator coupled to a bias node between the bias diode and the bias capacitor, wherein the comparator asserts a bias current signal in response to a voltage at the bias node rising above a threshold voltage; and
a NAND gate coupled to the inverter and responsive to the inverted first drive signal and the bias current signal to produce the bias drive signal.

4. The controller as in claim 1, wherein the first drive circuit and the second drive circuit are included in a monolithic integrated circuit.

5. The controller of claim 1 wherein the first drive circuit and the second drive circuit are included in a single integrated circuit package.

6. The controller of claim 1 the first drive circuit and the bias drive circuit are included in a single integrated circuit package.

7. The controller as in claim 1, wherein:
the bias drive circuit and the bias capacitor are coupled to the cathode of the bias diode at a bias node, and
to produce the bias drive signal, the bias drive circuit is further responsive to a bias signal at the bias node.

8. The controller as in claim 7, wherein:
the bias signal is indicative of available charge at the bias capacitor, and
the bias drive circuit is configured to determine when to assert or deassert the bias drive signal based on the bias signal.

9. The controller as in claim 1, wherein the bias drive circuit is configured to deassert the bias drive signal only when the first drive signal is deasserted.

10. The controller as in claim 9, wherein:
the current that is diverted through the bias diode to charge the bias capacitor when the bias drive signal is deasserted is a freewheeling current, and
the freewheeling current is established when an input switch of the power converter is turned off in response to the first drive signal being deasserted.

11. A buck converter comprising:
an input switch;
an output filter circuit coupled to the input switch and configured to produce a feedback signal indicative of an output voltage of the buck converter;
a bias capacitor coupled to the output filter circuit;
an output conductor circuit coupled to the output filter circuit; and
a controller coupled to the output filter circuit and to the output conductor circuit, the controller comprising,
a second drive circuit coupled to receive the feedback signal,
a first drive circuit coupled to the second drive circuit and responsive to the feedback signal to produce a first drive signal,
a bias drive circuit, coupled to the bias capacitor and to the first drive circuit, the bias drive circuit responsive to the first drive signal to produce a bias drive signal,
a bias transistor coupled to receive the bias drive signal, and
a bias diode having an anode of the bias diode coupled to a drain of the bias transistor and a cathode of the bias diode coupled to the bias drive circuit and the bias capacitor,
wherein when the bias drive signal is asserted the bias transistor is turned on and the bias diode is reverse biased to not conduct substantially any forward current, and when the bias drive signal is deasserted the bias transistor is turned off.

12. The buck converter as in claim 11, the bias drive circuit comprising:
an inverter coupled to receive the first drive signal and to produce an inverted first drive signal;
a comparator coupled to a bias node between the bias diode and the bias capacitor, wherein the comparator asserts a bias current signal in response to a voltage at the bias node rising above a threshold voltage; and
a NAND gate coupled to the inverter and responsive to the inverted first drive signal and the bias current signal to produce the bias drive signal.

13. The buck converter as in claim 11, the output conductor circuit comprising at least one diode.

14. The buck converter as in claim 11, wherein:
the second drive circuit is responsive to the feedback signal to produce a second drive signal, and wherein the output conductor circuit comprises a switch responsive to the second drive signal to deliver current to one of the bias diode and the bias transistor.

15. A forward converter comprising:

a first input switch and a second input switch;

an energy transfer element having a primary winding and a secondary winding, a first end of the primary winding coupled to the first input switch and a second end of the primary winding coupled to the second input switch;

a bias capacitor coupled to the first end of the primary winding;

a first clamp diode coupled from the second end of the primary winding to a source of the first input switch;

a second clamp diode coupled from a source of the second input switch to the first end of the primary winding;

a rectifier circuit coupled across a first end and a second end of the secondary winding;

an output filter circuit coupled to the rectifier circuit and configured to produce an output voltage signal; and a controller coupled to the first input switch, the bias capacitor, and the second input switch, and responsive to an input voltage signal to produce a first drive signal, the controller comprising, a second drive circuit coupled to the second end of the primary winding to receive a feedback signal indicative of the output voltage signal, a first drive circuit coupled to the second drive circuit and responsive to the feedback signal to produce a first drive signal, a bias drive circuit responsive to the first drive signal to produce a bias drive signal, a bias transistor coupled to receive the bias drive signal, and a bias diode having an anode coupled to the bias transistor and a cathode coupled to the bias drive circuit and to the bias capacitor, wherein when the bias drive signal is asserted the bias transistor is turned on and the bias diode is reverse biased to not conduct substantially any forward current, and when the bias drive signal is deasserted the bias transistor is turned off.

* * * * *